July 10, 1928.
H. D. GEYER
STEERING WHEEL
Filed Feb. 25, 1926
1,676,488
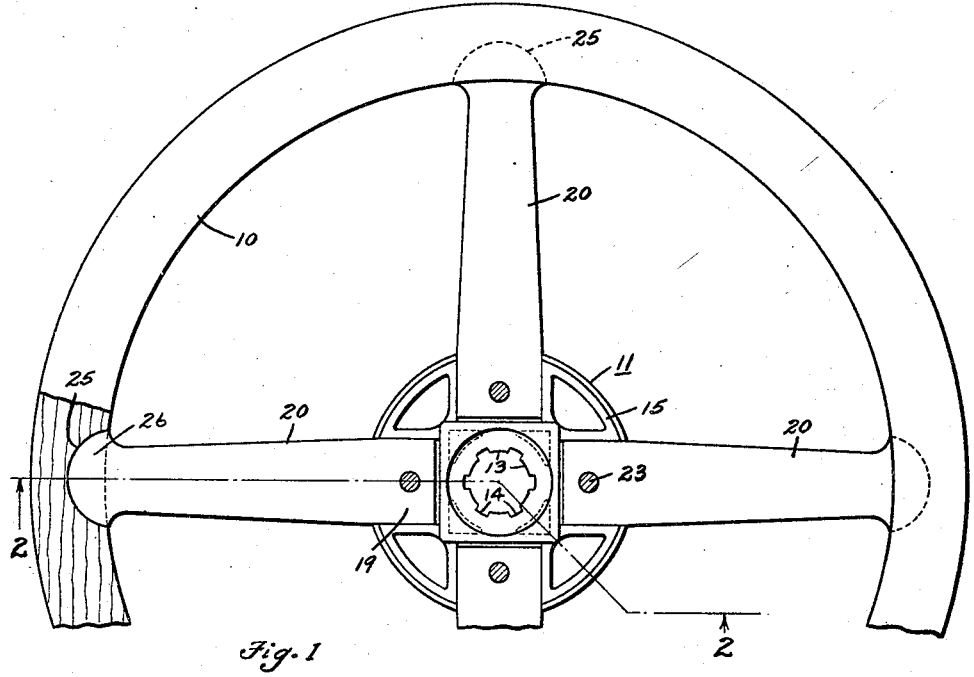
Fig. 1
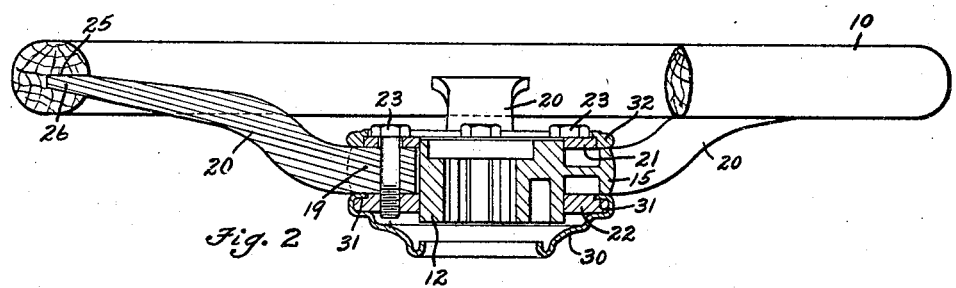
Fig. 2
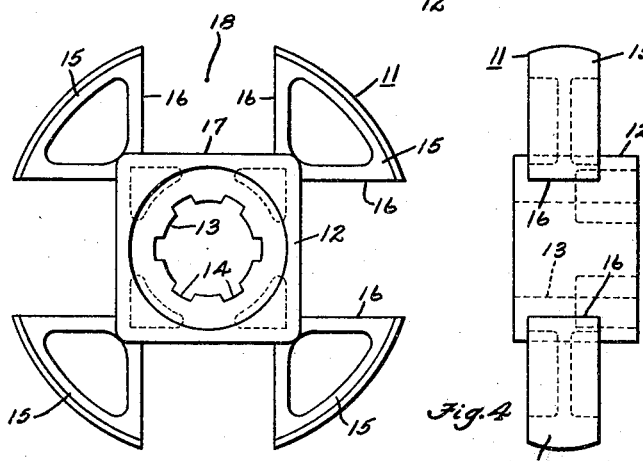
Fig. 3
Fig. 4
Harvey D. Geyer Inventor
By Spencer Sewall & Hardman
Attorneys Patented July 10, 1928.

1,676,488

UNITED STATES PATENT OFFICE.

HARVEY D. GEYER, OF DAYTON, OHIO, ASSIGNOR TO INLAND MANUFACTURING COMPANY, OF DAYTON, OHIO, A CORPORATION OF DELAWARE.

STEERING WHEEL.

Application filed February 25, 1926. Serial No. 90,672.

This invention relates to hand wheels, particularly such as are ordinarily used as steering wheels on automotive vehicles.

The general object of this invention is to provide an efficient, well-appearing, wood-spoke steering wheel construction which is more economical to manufacture than those heretofore produced.

A more specific object is to provide a construction having a form of metal hub which can be very economically die-cast, due to the fact that the recesses for the inner ends of the spokes are so designed that no coring is required in the casting thereof.

An important advantage of this hub construction lies in the method of assembly of the spokes to the rim. With this construction, the rim is provided with radial recesses on its inner periphery, and the outer ends of the spokes are individually inserted, radially, into these recesses into final position. The die-cast hub is then set down over the projecting inner spoke ends so that the said ends fall in the open-sided recesses in said hub, after which the clamping plates are assembled thereupon to rigidly hold all the parts together.

Further objects and advantages of the present invention will be apparent from the following description, reference being had to the accompanying drawings, wherein a preferred form of the present invention is clearly shown.

In the drawings:

Fig. 1 is a partial plan view of a steering wheel built according to this invention, but shows the top clamping plate removed;

Fig. 2 is a vertical section on line 2—2 of Fig. 1;

Fig. 3 is an enlarged detail view of the metal hub casting; and

Fig. 4 is a side elevation of Fig. 3.

Similar reference characters refer to similar parts throughout the several views of the drawing.

Numeral 10 designates the wooden rim which may be made according to any suitable and well-known method of manufacture. The central hub casting is indicated in its entirety by numeral 11. This casting comprises a sleeve portion 12 having a bore 13 which is adapted to fit over a steering shaft and be rigidly secured thereto by means of splines engaging grooves 14. In the case of four-spoked spiders, the sleeve 12 has a square outer periphery. Cast integral with the sleeve 12, and projecting radially from the corners thereof, are the four triangular-shaped lugs 15. These lugs 15 have flat sides 16 which are perpendicular to the flat faces 17 of the sleeve 12, thereby forming four rectangular recesses 18 for the reception of the inner ends of the spider spokes. The wooden spokes 20 have inner ends 19 fitting snugly within recesses 18, and are held in place therein by the upper clamping plate 21 and the lower clamping plate 22. These clamping plates 21 and 22 are provided with square central apertures which fit snugly over the square sleeve 12. The bolts 23, which clamp plates 21 and 22 together, pass through the inner ends 19 of the wooden spokes and are threaded into the lower plate 22. The inner ends 19 are preferably of slightly greater depth than the metal lugs 15. Therefore, when plates 21 and 22 are tightly clamped together, the clamping pressure will be taken by the inner ends 19 rather than by the lugs 15. It is thus seen that torque is carried from the spokes 20 directly to the square sleeve 12 through the clamping plates 21 and 22, rather than through the lugs 15. These lugs 15 serve chiefly to locate the clamping plates 21 and 22 longitudinally of the sleeve 12 and to give a circular outline to the hub portion. The hub casting 11 is preferably die-cast aluminum. Since the recesses 18 are open at both top and bottom, it is seen that no coring will be required and, hence, this casting 11 may be economically die-cast. The clamping plates 21 and 22 are preferably stamped out from sheet steel.

A lower decorative cover plate 30 is preferably provided to conceal the plate 22 and the lower end of sleeve 12. This cover plate 30 has an inturned flange 31 at its upper periphery, which is clamped between the plate 22 and the bottom surfaces of the lugs 15 and the inner ends of spokes 15, thus retaining it in place. This cover plate 30 is preferably stamped from polished sheet aluminum. The upper clamping plate 21 is preferably concealed by an annular aluminum ring 32. This ring 32 may be die-cast upon the steel plate 21 and thus retained in position.

This steering wheel is adapted to be used with a tubular steering post having spark and throttle controls placed in the housing above the center of the wheel in such manner that said housing extends adjacent ring 32 and conceals the bolts 23 and clamping plate 21.

It is thus seen that this metal hub may be economically manufactured, since all the metal parts thereof are either die-cast or are obtained from sheet metal. The above-described spider may be first completely assembled and then inserted in the rim 10 by any well-known method, such as by cutting recesses in the underside of the rim, inserting the outer ends of the spider arms therein, and then plugging up the unfilled recesses with wooden filler blocks. An important feature of this invention, however, is the method by which the spider spokes may be inserted in the rim in a more economical manner. For this method of insertion, the radial recesses 25 may be cut in the inner periphery of the rim 10 by a rotating cutter or routing wheel, or by any other suitable means. The outer ends 26 of the spokes 20 are then firmly pressed in place in these recesses 25 before the inner ends 19 are inserted in the central hub. The hub casting 11 may now be set down over the inwardly-projecting free ends 19 of the spokes 20 and may be rigidly secured thereto by the clamping plates 21 and 22, as hereinabove described. Obviously, this method of assembly permits a much more economical attachment of the spokes 20 to the rim 10, since the cutting of the recesses 25 is very simple and no filler blocks are required.

While the form of embodiment of the invention as herein disclosed, constitutes a preferred form, it is to be understood that other forms might be adopted, all coming within the scope of the claims which follow.

What is claimed is as follows:

1. A handwheel spider comprising: a cast metal hub having a sleeve portion adapted to fit over a shaft, said sleeve portion having a square outer periphery and integral lugs projecting from the corners thereof, four wooden spokes having inner ends projecting individually into the openings between said lugs, upper and lower clamping plates for clamping said inner ends rigidly in place between said lugs, said clamping plates having square apertures fitting snugly about the square outer periphery of said sleeve portion whereby torque is carried from said spokes through said clamping members to said hub.

2. A handwheel spider comprising: a cast metal hub having a sleeve portion adapted to fit over a shaft, said sleeve portion having a square outer periphery and integral lugs projecting from the corners thereof, four wooden spokes having inner ends projecting individually into the openings between said lugs, upper and lower clamping plates for clamping said inner ends rigidly in place between said lugs, said clamping plates having square apertures fitting snugly about the square outer periphery of said sleeve portion, and a lower pressed metal cover concealing said lower clamping member and retained in place thereby.

3. A handwheel spider comprising: a cast metal hub having a sleeve portion adapted to fit over a shaft and four integral lugs projecting radially therefrom and equi-angularly spaced, four wood spokes having their inner ends projecting individually into the openings between said lugs, upper and lower separate metal clamping plates and tie members therefor for clamping said inner ends rigidly in place, said upper and lower clamping plates both having non-circular apertures snugly fitting corresponding portions of said cast hub, whereby torque is carried from said spokes through said clamping plates to said hub.

4. A handwheel spider comprising: a cast metal hub having a sleeve portion adapted to fit over a shaft and four integral lugs projecting radially therefrom and equi-angularly spaced, four wood spokes having their inner ends projecting individually into the openings between said lugs, upper and lower separate metal clamping plates and tie members therefor for clamping said inner ends rigidly in place, said upper and lower clamping plates both having non-circular apertures snugly fitting corresponding portions of said cast hub, whereby torque is carried from said spokes through said clamping plates to said hub, and a lower pressed metal cover concealing said lower plate and lower hub portion and retained in place by having portions thereof clamped between said lower plate and wood spokes.

5. A handwheel spider comprising: a cast metal hub having a sleeve portion adapted to fit over a shaft and four integral lugs projecting radially therefrom and equi-angularly spaced, four wood spokes having their inner ends projecting individually into the openings between said lugs, upper and lower flat steel clamping plates each having non-circular apertures snugly fitting corresponding portions of said cast hub, and tie pins extending through said spoke inner ends and rigidly clamping said spoke ends between said plates.

6. A handwheel spider comprising: a die cast aluminum hub having a sleeve portion adapted to fit over a shaft and four integral lugs projecting radially therefrom and equi-angularly spaced, four wood spokes having substantially rectangular inner ends projecting individually into the openings between said lugs, upper and lower steel clamping plates each having non-circular central apertures snugly fitting around corresponding portions of said die cast hub, and tie pins extending through said spoke ends and rigidly clamping said spoke ends between said plates.

7. A handwheel spider comprising: a die cast aluminum hub having a sleeve portion adapted to fit over a shaft and four integral lugs projecting radially therefrom and equiangularly spaced, four wood spokes having substantially rectangular inner ends projecting individually into the openings between said lugs, upper and lower steel clamping plates each having noncircular central apertures snugly fitting around corresponding portions of said die cast hub, and tie pins extending through said spoke ends and rigidly clamping said spoke ends between said plates, and a lower pressed metal cover concealing said lower plate and retained in place thereby.

In testimony whereof I hereto affix my signature.

HARVEY D. GEYER.